US011397670B2

(12) United States Patent
Rohleder et al.

(10) Patent No.: US 11,397,670 B2
(45) Date of Patent: Jul. 26, 2022

(54) EMBEDDED INFORMATION SYSTEM AND METHOD FOR MEMORY MANAGEMENT

(71) Applicant: NXP USA, Inc., Austin, TX (US)

(72) Inventors: Michael Rohleder, Unterschleissheim (DE); Marcus Mueller, Munich (DE); George Adrian Ciusleanu, Marasesti (RO); Marcel Achim, Montreal (CA)

(73) Assignee: NXP USA, Inc., Austin, TX (US)

( * ) Notice: Subject to any disclaimer, the term of this patent is extended or adjusted under 35 U.S.C. 154(b) by 51 days.

(21) Appl. No.: 17/121,682

(22) Filed: Dec. 14, 2020

(65) Prior Publication Data
US 2021/0216445 A1 Jul. 15, 2021

(30) Foreign Application Priority Data

Jan. 10, 2020 (RO) .............................. a 2020 00008

(51) Int. Cl.
*G06F 12/00* (2006.01)
*G06F 13/00* (2006.01)
(Continued)

(52) U.S. Cl.
CPC ........ *G06F 12/0238* (2013.01); *G06F 9/5016* (2013.01); *G06F 12/0891* (2013.01); *G06F 2212/466* (2013.01)

(58) Field of Classification Search
CPC ............. G06F 9/5016; G06F 2212/466; G06F 12/0891; G06F 12/0238
(Continued)

(56) References Cited

U.S. PATENT DOCUMENTS 6,385,699 B1 5/2002 Bozman et al.
6,438,653 B1 8/2002 Akashi et al.
(Continued)

OTHER PUBLICATIONS

U.S. Appl. No. 16/869,249, filed May 7, 2020, 40 pages.
U.S. Appl. No. 16/431,124, filed Jun. 4, 2019, 59 pages.

*Primary Examiner* — Edward J Dudek, Jr.
*Assistant Examiner* — Sidney Li

(57) ABSTRACT

An embedded information system includes a load control circuit coupleable to an external memory that contains instructions and constant data (organized by variable sized load units, LUs, and where at least one property of a LU is specified within metadata) associated with application code of a software application, at least one processor configured to execute the at least one application code; an internal memory configured as main system memory in a first part and as a cache for storing the instructions and constant data for an execution of the at least one application code from the external memory in a second part. The load control circuit is configured to load the LUs associated with the at least one application code from the external memory with a granularity of a single LU into the internal memory. A cache control circuit, manages the second part, based on metadata corresponding to the LUs, by being configured to: observe the execution of the application code by detecting at least one of: an LU being executed, a change from one LU to another LU within the internal memory; load metadata information corresponding to a LU instance from the external memory or the internal memory, specify a next LU to be loaded by the load control circuit into the second part; and specify a next LU to be evicted from the second part when there is insufficient space for loading the next LU.

15 Claims, 6 Drawing Sheets

(51) Int. Cl.
*G06F 13/28* (2006.01)
*G06F 12/02* (2006.01)
*G06F 9/50* (2006.01)
*G06F 12/0891* (2016.01)

(58) Field of Classification Search
USPC .......................................................... 711/154
See application file for complete search history.

(56) References Cited

U.S. PATENT DOCUMENTS

| | | |
|---|---|---|
| 6,473,836 B1 | 10/2002 | Ikeda et al. |
| 6,478,112 B2 | 11/2002 | Lee |
| 6,708,155 B1 | 3/2004 | Honarvar et al. |
| 7,038,982 B2 | 5/2006 | Schreurs et al. |
| 9,892,044 B1 | 2/2018 | Wallace et al. |
| 10,120,713 B2 | 11/2018 | Rohleder et al. |
| 2005/0155026 A1* | 7/2005 | DeWitt ................. G06F 11/348 714/E11.2 |
| 2005/0262287 A1* | 11/2005 | Tran ........................ G06F 9/445 711/5 |
| 2008/0165373 A1* | 7/2008 | Woo ................... H04N 1/40012 358/1.9 |
| 2010/0030963 A1 | 2/2010 | Marcu et al. |
| 2013/0326492 A1* | 12/2013 | Hunt ................... G06F 9/44521 717/163 |
| 2020/0272512 A1* | 8/2020 | Rohleder ................ G06F 9/542 |

* cited by examiner

FIG. 1 – Introduction

EMBEDDED INFORMATION SYSTEM AND METHOD FOR MEMORY MANAGEMENT

FIELD OF THE INVENTION

The field of the invention relates to an embedded information system and a method for memory management therein. The field of the invention is applicable to, but not limited to, mechanisms for memory management in a memory constrained environment that is supporting software execution in an embedded information system, such as in-vehicle.

BACKGROUND OF THE INVENTION

Computer systems often benefit from a hierarchical memory design, for example in which (at least partial) copies of the memory content can be stored (i.e., cached) at different levels within the memory hierarchy. Often, the hardware supporting the different memory levels has different capacities, costs, and access times. Generally speaking, faster and smaller memory circuits are often located closer to processor cores or other processing elements within the system, and serve as caches. Slower memories may be larger but are also relatively slow compared to those memories acting as caches.

It is known that some levels of this memory hierarchy may be located on the same semiconductor device as the processor cores or other master devices, whilst other levels may be located on another semiconductor device. A corresponding memory hierarchy also permits to exploit technology differences between semiconductor devices, for example when there are different technologies required for implementing a pure logic device or a device that contains a non-volatile memory. A semiconductor device that implements both, namely the compute logic (e.g. processor elements) and a non-volatile memory (NVM) must carry the cost burden of both technologies. In contrast, implementing both functions within two separate semiconductor devices may permit a more cost optimized implementation.

In such a memory hierarchy configuration, the main memory within the compute logic semiconductor device may act as a cache for loading instructions and constant data from a further semiconductor device, which implements/provides an external NVM. For performance reasons, execution of these instructions may then be performed by reading the cached copy. For cost reasons, the main memory may be smaller than the size of the embedded NVM, which is also beneficial in cases where the NVM holds more than one copy of an application; e.g. to support an over-the-air download of a new version of a software application, whilst the 'actual' version the application is being executed.

Reducing the available main memory further, for example to a size that is significantly smaller than the executed software application, can provide further cost benefits, which can make the right-sizing of such a memory subsystem a desirable design target.

However, the usage of main memory as instruction cache in such a memory hierarchy system has distinct characteristics, compared to traditional processor caches (usually referred to as 'Level 1' and 'Level 2' caches), and may also be implemented in addition to those caches. A first difference of such an instruction cache is its relative size. Whilst traditional caches are usually small or very small compared to the main memory, the size of a corresponding cache will usually be about 75%-25% of the size of an application image. When the actually used portion of an application is smaller, a further reduction of this size may also be possible.

Currently, typical users of embedded information systems used in a vehicle are requesting support for an application image having up to 16 Mbyte in size, calling for an instruction cache in the range of 4 to 12 Mbyte. In the forthcoming years these numbers are likely to increase. It is noteworthy that the size of such an instruction cache is on top of the usual memory requirements for data storage by the application, which may be of an equivalent size. A second, equally important, difference is the latency and bandwidth characteristics of these external NVMs, which not only require a relatively large overhead for a single transmission, but also provide a very limited bandwidth for the loading of the instructions.

To account for these limitations, it is beneficial to properly define the amount of data (i.e., the size of a load unit (LU)) being loaded to ensure that only information is loaded that is needed; otherwise a negative impact on the bandwidth can be expected. Since the amount of instructions used by software can vary largely, variable sized LUs are mandatory, in order to avoid loading of unwanted data. On the other side, these LUs shall be large enough to avoid any significant impact of the transaction overhead. Both parameters suggest LU sizes larger than a cache line of a traditional processor Level 1 or Level 2 cache, but also small enough to require the support of several hundred, thousand or even one or two magnitudes larger amount of LUs by such an instruction cache.

Furthermore, the typical on-demand requests utilized by a traditional Level 1 or Level 2 cache, in a case of a cache miss, may result in a too large access latency; which suggests to also investigate other cache management mechanisms that avoid an on-demand loading.

In case of a cache size that is relatively large compared to an application image, one potential solution is to prefer the storage of more valuable instructions, which results in only rarely needed instructions being loaded. This does not only reduce the amount of required load operations (beneficial for the bandwidth), but also limits the potential for cache misses when it is possible to properly identify rarely needed instructions.

Thus, a memory hierarchy system is needed whereby the limitations in the latency and bandwidth may be reduced or mitigated, particularly when operating with a large random access memory (RAM).

SUMMARY OF THE INVENTION

The present invention provides an embedded information system and a method for memory management therein, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
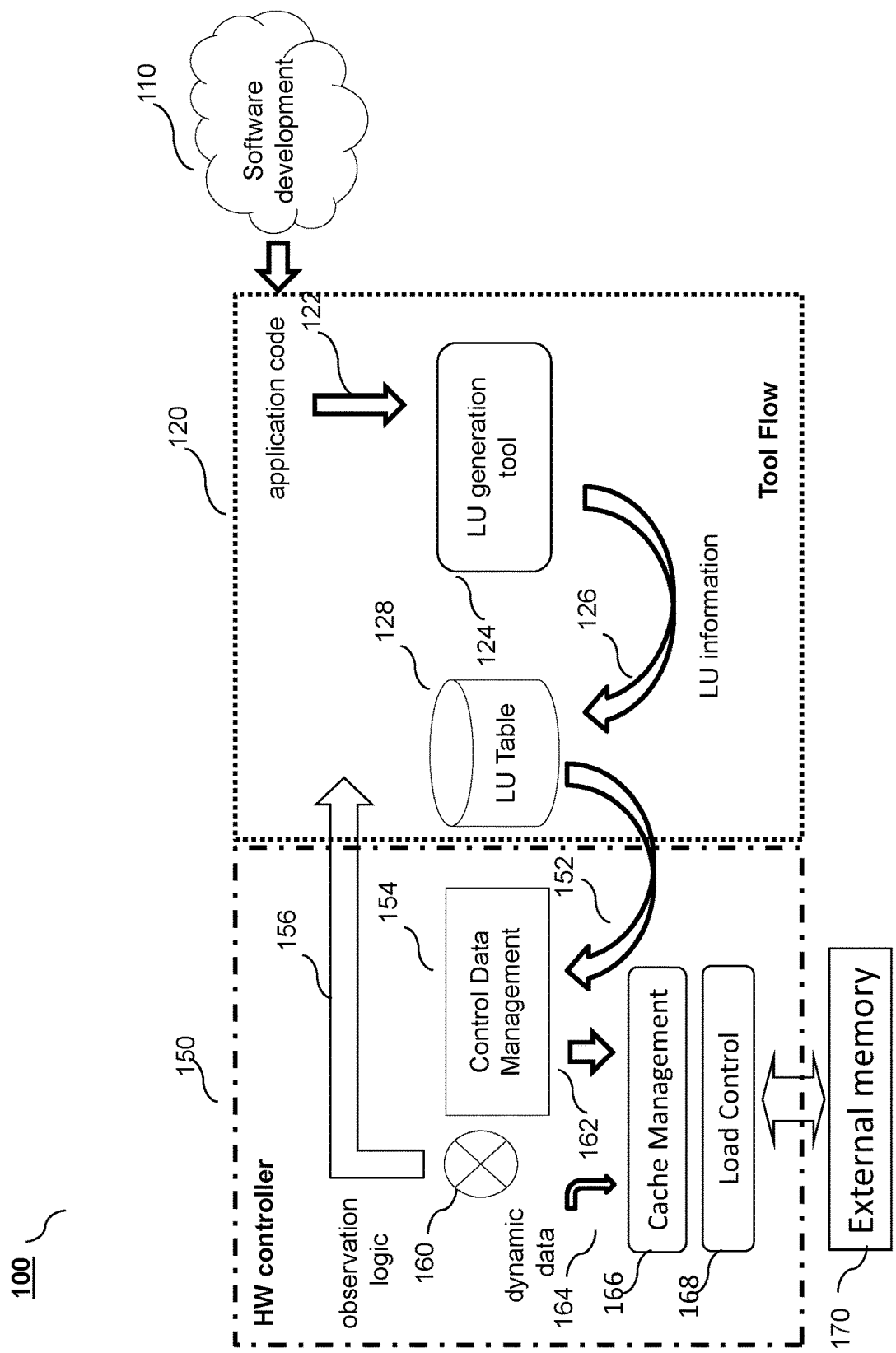
FIG. 1 illustrates an overview example diagram of an approach for using a memory as a cache for loading a set of instructions and constant data using variable sized load units from an external memory, in accordance with some example embodiments of the invention.

In order to address the limitations, shortcomings and restrictions of the classical approach for using a memory as a cache for pre-loading and/or loading a set of instructions and constant data from an external memory, a system is described with a large memory that implements a cache structure in memory, e.g. random access memory (RAM), for instructions and constant data, notably utilizing variable sized load units (which is unlike known processor cache arrangements) and supporting a decoupled load request and cache eviction operation for the cache management. In examples of the invention, a cache controller circuit (preferably in hardware) is provided that is configured to optimize the contents of the large memory, by using a combination of the decoupled load request and cache eviction operation and configured to observe the software being executed to thereby enable the operations to run independently, at different times, but managed from same data set. In this manner, the cache may be quickly pre-loaded with data from the external memory and the cache controller circuit is able to identify the most worthy data elements to be kept in the memory. Thus, in this manner, the steering of the loading of corresponding information (instructions and constant data) is able to exploit information that is already in existence.

In some examples, the cache controller circuit may also be configured to record related information of the observed software being executed, determined upon a switch from one requested LU to another LU. The information collected may also be utilized by the cache management for steering its operation, in accordance with at least one example embodiment.

Collected data and other information that is already in existence, also named metadata since it is data about data, is further referred to as raw data. Already existing metadata may have been generated by another, eventually external and timely decoupled processing, like a tool flow. In some examples, this metadata may be combined with data collected by the observation. Corresponding information may be delivered in form of a data structure that provides related information for every LU or a set of LU instances, where the term LU "instance" refers to a single load unit. In some examples, updating the content of this data structure with the collected information permits to record this data permanently.

In some examples, a first element that handles the load request is decoupled from a second element that handles the cache eviction operation for the cache management. In some examples, the first element utilizes the raw data for a first calculation of a first weight that independently controls the load request operation, and the second element utilizes the raw data for a second calculation of a second weight that independently controls the cache eviction operation. In some examples, the first calculation of the first (load request) weight and the second calculation of the second (cache eviction) weight may be based on the same raw data provided by the data structure, thereby utilizing a separate, specific, programmable formula that is capable of specifying a different selection and interpretation of this common raw data. For this purpose, corresponding metadata may be loaded from the data structure into an internal processing element in order to enable its utilization.

Examples of the invention propose an embedded information system that includes an internal memory configured to store data for a software application as main system memory in a first part of the internal memory and as a cache for storing instructions and constant data for an execution of at least one application code from an external memory in a second part of the internal memory. At least one processor and the internal memory are both coupled to an interconnect. In some examples, the interconnect may further couple (besides other peripherals) to a cache control circuit and to a load control unit. The load control unit is coupleable to the external memory that contains instructions and constant data associated with the at least one application code. In some alternative examples, the cache control circuit may include the load control unit. In some examples, the cache control circuit or the load control circuit may also be directly coupled to the internal memory. The load control circuit is configured to load the LUs associated with the at least one application code from the external memory with a granularity of a single LU into the internal memory. The instructions and constant data of the at least one application are organized by load units (LUs), having a different size, and where at least one property of the LUs is specified within metadata. Examples for the properties of a LU that are stored within metadata are the start address, and or the size or an end address of this LU (which basically defines the address range to be loaded). Other properties that are beneficial or may be needed include a checksum (e.g. created by a cyclic redundancy check) that may be used to validate the correct loading, or further information that may be utilized to define a sequence for the loading of multiple LUs. The load control unit is configured to load the LUs associated with the at least one application code from the external memory with a granularity of a single LU into the internal memory. The cache control circuit manages the second part of the internal memory that is configured as a cache, based on metadata corresponding to the LUs, by being configured to: observe the execution of at least a part of the at least one application code by detecting at least one of: an LU being executed, a change from one LU to another LU within the internal memory; load metadata information corresponding to a LU instance from the external memory or the internal memory; specify the next LU to be loaded by the load control unit, and specify the next LU to be evicted from the internal memory when there is insufficient space for loading the next LU.

In this manner, a provision of a cache control circuit configured to: specify the next LU to be loaded by the load control unit, specify the next LU to be evicted from the main system memory when there is insufficient space for loading the next LU, and observe the execution of the at least one application by the system with a granularity of a single LU, advantageously improves (and in some instances optimises) the actual cache content in order to cope with the bandwidth and latency limitations of the external memory system. Such an observation is only possible by a hardware-based solution, which also provides (i) the needed concurrency of operations, independent from the application execution, and (ii) the performance required to reduce/minimize any impact on the application execution. It is further envisaged in examples of the invention that hardware usage further enables a rapid reaction to a missing LU (e.g. by a high priority "emergency" load operation), which reduces/minimizes any impact of a corresponding stall situation on the application execution. Such an observation also facilitates concurrent recording of raw data associated with such incidents, in order to support issue debugging or subsequent run-time optimizations. In some examples, the observation may be of the accesses during an execution of the application code.

Referring now to FIG. 1, an overview of a system 100 that uses a memory as a cache for loading or pre-loading a set of instructions and constant data from an external memory is illustrated, in accordance with some example embodiments of the invention. The system 100 identifies a usage of a tool-based flow 120 for an identification of the LUs and its beneficial usage by such an instruction cache implementation.

A classical software development environment 110 generates the corresponding application code, which is then analysed 122 by the tool-based flow 120. Only the tool-based flow 120 interacts with the software development environment 110, for example to control or update the specification of a load unit (LU).

A load unit generation software tool 124 executed by the tool-based flow 120 generates metadata 126 about structuring the application code within a set of LU instances by utilizing the analysis results of the application code. This LU information (metadata 126) is then stored within a database, referred to as an LU table 128. The LU table 128 provides the metadata (i.e. data about data) about the variable sized LUs in a form of a replicated data structure, where the content of a single data structure specifies a single LU instance and holds related further information. The initial content of the LU table 128 may be generated from static information, for example determined by analysing the application code, in particular the set of included functions and their caller/callee and other relationships. Combining one or multiple functions into a LU in accordance with these relationships intends to generate LU instances having an acceptable size. An organization of a software application into LU instances defines a granularity of the load process, which is required to store at least a start address and a size (or alternatively the end address) of LUs within its metadata. In some examples, dependencies between the LU instances may be used to further specify a load sequence. In accordance with some examples of the invention, additional properties may be specified for every LU. In accordance with some examples of the invention, the content of the LU table 128 may be further refined using data collected by a Cache Controller circuit, or gathered otherwise, e.g. by a profiling function.

Since the application executes its software with the granularity of functions, the output of the tool-based flow 120 is beneficially the specification of LU instances that combine one (or multiple) software function(s), which is/are itself/themselves assumed as atomic elements by this LU generation step/operation. Hereafter, any LU may be envisaged as an address range that combines one or multiple software functions.

A hardware (HW) controller device 150 that manages such an instruction cache in the context of executing the application software provides a high-level usage of this LU metadata. Other elements that are obviously also required for this purpose, in particular the internal memory for storing the load units, or the processing elements running the application software are not shown in this figure, for ease of explanation and not to obfuscate the concepts herein described. Furthermore, it is noteworthy that the generation of the LU table 128 information by the LU generation tool 124 may be decoupled in both a time and spatial sense from using this information by the HW controller device 150.

The HW controller device 150 employs a Control Data Management Unit 154 that reads metadata 152 from the LU table 128 and provides this read metadata 162 to a cache management circuit 166 that is arranged to steer the instruction cache management. Usually the cache management circuit 166 will utilize further information, e.g. dynamically generated data 164 for this purpose. Examples of such dynamic data include:
   i) the fill status of the main memory that has been dedicated for usage by the instruction cache,
   ii) information about ongoing or outstanding load operations,
   iii) information about the application status that may be provided by software via programming of status registers,
   iv) information about the status of the processing system, or
   v) status information provided by elements that are internal to the HW controller device 150 or by the external memory 170, etc.

A major function overseen by the cache management circuit 166 is the loading of LUs. For this purpose, the HW controller device 150 will usually include or employ a load control unit 168, which is configured to perform this function. For this purpose, the load control unit 168 is connected to the external NVM memory 170.

In accordance with examples of the invention, such processing steps/operations may be beneficially observed by an observation circuit 160 that is configured to identify events or properties of interest for the usage of this instruction cache in the context of the application execution. Since the instruction cache is utilizing LUs for its management, these events are usually related to LUs. It is envisaged that some examples for collected information include, e.g., the number of usages of a LU, optionally further qualified with its previous cache status, the execution time of a LU, the time when a LU changes, or a corresponding delay. Such information may be beneficially collected in relation to the LUs, since one aim of the observation circuit 160 is to identify potential optimizations related to these LUs. For this purpose, the observation circuit 160 may be beneficially coupled to the Control Data Management Unit 154 in order to have access to corresponding information. In some examples of the invention, collected information by the observation circuit 160 may then be reported back 156; i.e. to the application software, via status registers (not shown), or by a specific reporting or observation channel that is dedicated for this purpose. In some examples, it is envisaged that it may also be possible to utilize existing debugging facilities (e.g. a trace generation facility) for this reporting back 156 mechanism. However, in this example, it is noted that this reporting back 156 mechanism will block these facilities and functions for being used by their original usage for a temporary period. A prime candidate for the usage of this information is the tool-based flow 120, which can utilize this information for further improvements.

In some examples, it is envisaged that the HW Controller device 150 that is utilized by an instruction cache as described above, needs to take into account very different cache management factors than previously considered in known instruction cache installations. For example, known L1/L2 caches have usually 64-256 cache sets, which is an unacceptable small number for managing the amount of LU instances of a complete application image. Also the data managed by a single cache set in known instruction cache installations is of fixed length and very small, usually in a range of 4 or 8 times a data way consisting of 16 up to 64 words. Both of these properties, i.e., the small size of a cache data set as well as the limitation to only support a single, fixed cache line size, would be unacceptable for an example embodiment due to the earlier described bandwidth limitations of the targeted external non-volatile memories. Furthermore, the sheer amount of LUs that must be supported to implement an instruction cache that is capable to hold 25%-75% of a complete application image (several hundred LUs up to several thousands of LUs, or one or two magnitudes more) is too large to read the LU table into the HW Controller device 150. Since the management of every LU requires several pieces of information (at least its address range, usually encoded by a start address and a size or end address, which may be combined with further information stored in the metadata, e.g. a check sum and load sequence information), this is a non-neglectable amount of data. Additionally, this amount may vary largely, which negates any beneficial usage of an embedded memory for this purpose. Simply said, any selected size that is good for one application will be wrong for another application; as there is simply too much variation possible when structuring a piece of software. Also, the metadata associated with a single LU may be relatively large, which makes it imperative to minimize the required hardware elements for storing this information. Therefore, in order to address this issue, together with the previous issues, examples of the invention beneficially use the main memory for also storing the LU table information. The metadata may be required by multiple circuits or components within the HW Controller device 150; e.g. by the cache management circuit 166 for managing the cache operation, but also by the observation circuit 160. Any circuit or component in need for metadata must have access to the LUs that are currently being managed by it, which is not necessarily the same LU for all processing elements, circuits or components.

In accordance with some examples of the invention, the usage of variable sized LUs, e.g. permitting a LU size in the range 1 k-64 k (or in some instances 1 k-256 k) may cause complications. Supporting a LU size that is smaller than 1 k would not be beneficial, since the bandwidth overhead for loading smaller LU instances would be prohibitively large. For example, it is always possible that a single (large) LU must replace multiple (smaller) LUs.

On the other hand, loading of a small LU may be possible without replacing another one, when an earlier replacement of a large LU left enough space. Hence, to address this potential problem of using variable sized LUs, examples of the invention propose to decouple the corresponding operations, making a load request a distinct operation from the cache eviction operation utilized to provide the free space in which a LU is being stored during the load operation.

The above list of complications makes the management of such an 'instruction cache' a distinct problem, as compared to the management of a traditional level 1 or level 2 processor cache. On the other side, the main characteristic of the described instruction cache is to be a system-wide cache within an embedded information system running a known software application, and not being a cache that is specific for a processor or a processing cluster (as L1/L2 caches are). Furthermore, its size in relation to the main memory and the external memory enforce corresponding differences in its behaviour and management.

It is notable that any similarity to the management of the cache within a disk controller of some aspects of these examples, differs in that a disk controller completely lacks an execution observation context of the loaded information (data vs. instructions). Furthermore, the performance characteristics of these caches correspond usually to physical properties of the read process (bandwidth provided by the read head, and mechanical times for moving the read head) and thereby have no relationship to the execution of an application (or parts of it). These characteristics are very different from the design goals (that support the execution of a known application) and bandwidth requirements of the described cache, which are related to the access bandwidth of one or multiple embedded processors on one side and the very limited access bandwidth provided by an external NVM in the targeted type of embedded information systems on the other side. This difference in approach and implementation also applies to solid state disks, which are also NVM based, but operate in wholly different types of system bandwidth and latency.

Figure 2:
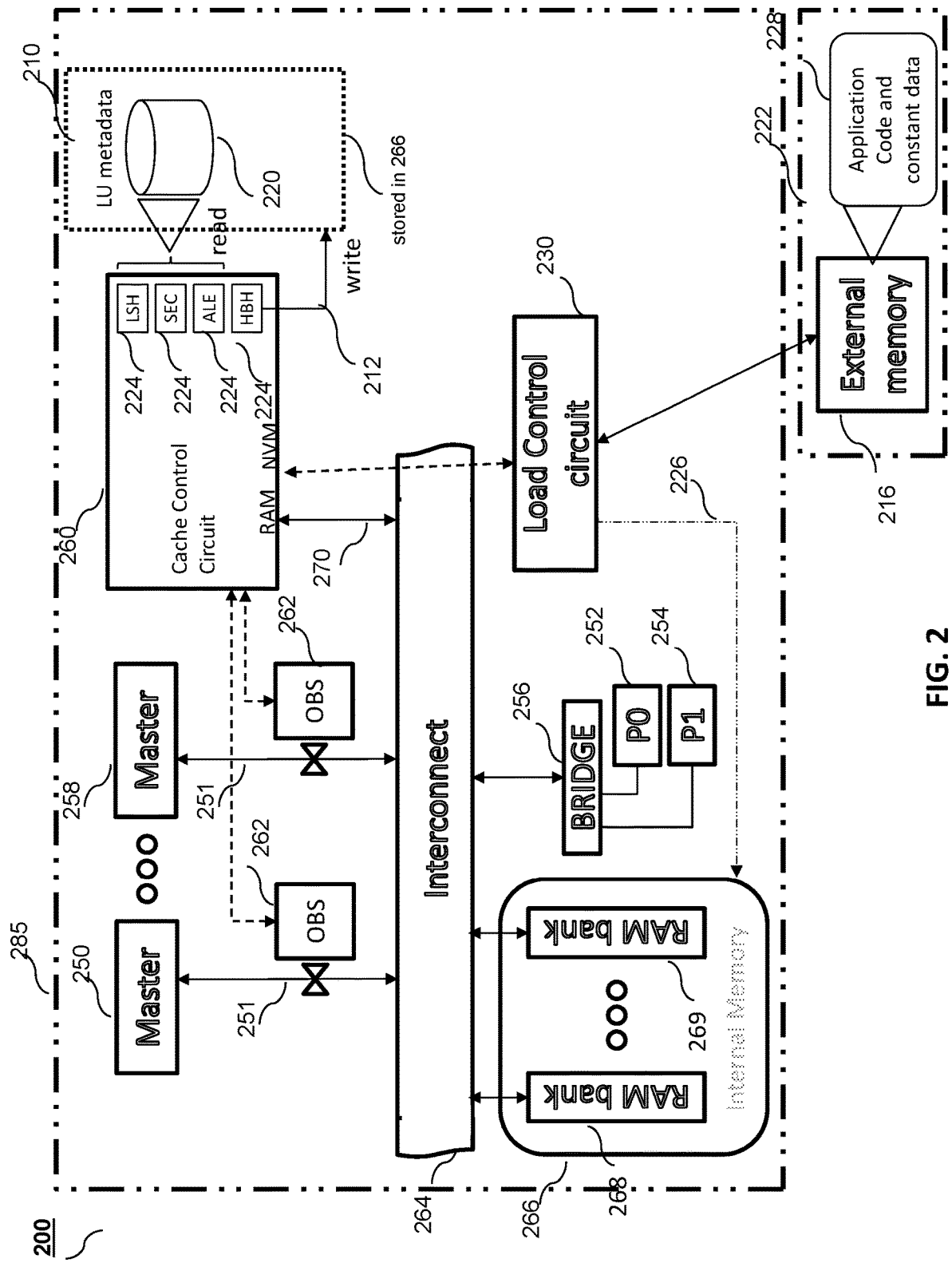
FIG. 2 illustrates an example diagram illustrating an instruction cache that utilizes the internal main memory as storage for the software instructions to be performed within an information processing system, in accordance with some example embodiments of the invention.

Referring now to FIG. 2, an example of an embedded information processing system 200 having an instruction cache that utilizes an internal main memory as storage for software instructions to be performed by the system is illustrated, in accordance with some example embodiments of the invention. The information processing system 200 implements the related processing elements within a first integrated circuit 285, while the software instructions to be performed by the information processing system 200 as well as associated constant data 228 are stored in an external, non-volatile memory 216 within a second integrated circuit 222.

Usually an application image always contains the instructions forming the software part of this application, as well as associated constant data, which is either used as constant read-only data or to initialize a variable value (in both cases the corresponding value is defined during the software development). In the latter case (sometimes referred to as variable initialization) the constant read-only data is copied to the volatile memory that holds the application data when starting an application. In contrast to these read-only initialization values, constant read-only data may be directly accessed, equivalent to reading a software instruction. Both kinds of read-only constant data are emitted by a compiler into the application code image and should be stored in non-volatile memory. Therefore this type of read-only (constant) data must be managed equivalently to software instructions, especially since it is also part of an application image.

In some examples of the invention, the first integrated circuit comprises processing structures, such as processor cores or other bus masters (e.g., a direct memory access (DMA) controller or a co-processor) depicted in an exemplary manner as bus masters 250 through 258. Any number of bus masters (one or multiple) 250-258 and any type of bus master (i.e. processor core, co-processor, or peripheral that can also act as a bus master) may be implemented. These processing structures are connected to an interconnect 264 (which may be a single interconnect or a set of specific interconnects) via a plurality of bus interfaces (not shown). The interconnect 264 connects these bus masters to bus slaves responding to access requests, such as an internal memory 266 or peripherals represented in an exemplary manner by peripheral-P0 252 and peripheral-P1 254, which are often connected to the interconnect via a specific peripheral bridge 256. Also, in some examples, a direct connection of a peripheral to the interconnect 264 may be possible. In many cases, the internal memory 266 (which implements the main system memory that is used e.g. to store application data) is built from multiple memory blocks, which may be organized in random access memory (RAM) banks, here shown in an exemplary manner as RAM banks 268 through 269.

A first part of the instruction cache implemented within the information processing system 200 utilizes the internal memory 266 as intermediate storage for instructions and constant data of an application that is read from the external memory 216; in addition to the traditional usage of this memory for storing the data being processed by this application. For cost reasons, the size of the internal memory is desirably smaller than the size of the application and constant data 228 made available by an application image within the second semiconductor circuit 222. Therefore, there may be only a portion of the application and constant data 228 stored within the second semiconductor circuit 222 that is made available for execution and read access within the cache storage, which is implemented by the portion of the main memory 266 that is dedicated for this purpose. A typical ratio for this size would be 25%-75% of the size for the application and constant data 228 stored within the external memory 216 within the second semiconductor circuit 222, which is on top of the memory required for storing application data. Alternatively, in one example embodiment, there may be a maximum supported application size of 16 Mbyte provided within the external NVM memory, having a need for further 4 Mbyte to store its application data. For this example, assuming a 50% ratio, the corresponding size requirement for the main memory would be 50% of the 16 Mbyte (i.e., 8 Mbyte) in addition to the 4 Mbyte for the constant data 228 (resulting in a requirement to implement at least 12 Mbyte main memory).

A second part of the instruction cache implemented within the information processing system 200 utilizes a hardware controller circuit, e.g. a preferred embodiment of the HW Controller 150 of FIG. 1. The hardware controller is operable to perform at least three separate functions, e.g. observation, data loading and data management, and/or contain circuits to perform said functions. In some examples, this functionality may be implemented within a single circuit. In one example embodiment, a first portion of the hardware controller functionality is implemented within a load control circuit 230, which is connected to the external NVM memory 216 and configured to perform the accesses to the application code and constant data 228 stored within it. A second portion of the hardware controller functionality is an observation function, here depicted by a set of observation circuits 262, where one of these observation circuits is observing the processing by a bus master 250-258, and in particular observing the accesses corresponding to the instruction execution by software and related accesses to the application code and constant data 228. For this purpose, an observation circuit 262 may be connected to an interface 251 connecting a bus master 250-258 to the interconnect 264. It is envisaged that in other examples, other connections may also be used when they permit an identification of an actual request and its source. A third portion of the hardware controller functionality is a cache control circuit 260 that utilizes the observation information provided by the observation circuit(s) 262 and steers the loading of data from the external memory 216 by the load control circuit 230. Usually, such a cache control circuit 260 interfaces with software via a set of programmable registers, similar to peripherals P0 252, P1 254. Equivalent to these peripherals it connects to the interconnect 264, either directly or via a bridge 256 (where this potential connection is not shown in FIG. 2 in order to not obfuscate the description).

In accordance with some example embodiments of the invention, the hardware controller reads metadata information from a LU table 220 in order to determine the load units it utilizes to manage the instruction cache (content). In a preferred embodiment, this metadata is located within the internal memory 266 within a data structure that contains the metadata information for every LU instance being identified. In another example embodiment, the metadata information for every LU instance being identified may also be stored in form of read-only information within the external memory 216 and directly loaded from this memory. In another embodiment, it may be provided within the external memory 216 and before or during application start loaded into the internal memory 266. To have access to this metadata, the hardware controller, and in the example of FIG. 2 the cache control circuit 260, utilizes one or more additional connections 270 to the interconnect 264 that permit at least access to the content of the internal memory 266. Furthermore, the load control circuit 230 requires a similar capability in order to access the internal memory 266, in order to be able to store the application code (instructions and constant data) 228 that it reads from the external memory 216 into the internal memory 266. For this purpose, in some examples, it may use or re-use one of the additional connections 270 of the cache control circuit 260 (to which is must be connected in any case), or in some examples it may alternatively utilize its own dedicated (optional) connection 226 that permits at least a write access to the internal memory 266 (highlighted in a separate dotted box in the figure for clarity purposes only).

In accordance with some example embodiments of the invention, the cache control circuit 260 accesses the metadata 210 provided within the LU table 220, which is located within internal memory 266, via a set of dedicated metadata containers (or elements) 224. Every instance of these metadata containers 224 is operable to receive the metadata related to a single LU instance; and is utilized by particular functionality within the cache control circuit 260. In this manner, an independent usage of these metadata containers 224 within the cache control circuit 260 permits a beneficial concurrency of using the corresponding data, which results in a faster processing and avoids any potential stall or lock condition that may otherwise be caused by multiple functions requesting access to metadata 210 information for a LU instance that is currently being processed. It is the nature of hardware that it can only support a fixed amount of storage locations, which makes it important to identify a minimum amount of such containers in order to provide an optimal amount of metadata containers 224 to support the cache management functionality; which is the minimum set of containers that permits maximum concurrency of the cache management operation. One or more of these containers may also be used to hold or record raw data collected during the execution observation that can be written back 212 to the LU metadata table 220, which generates a persistent copy of this information within the LU metadata 210.

Figure 3:
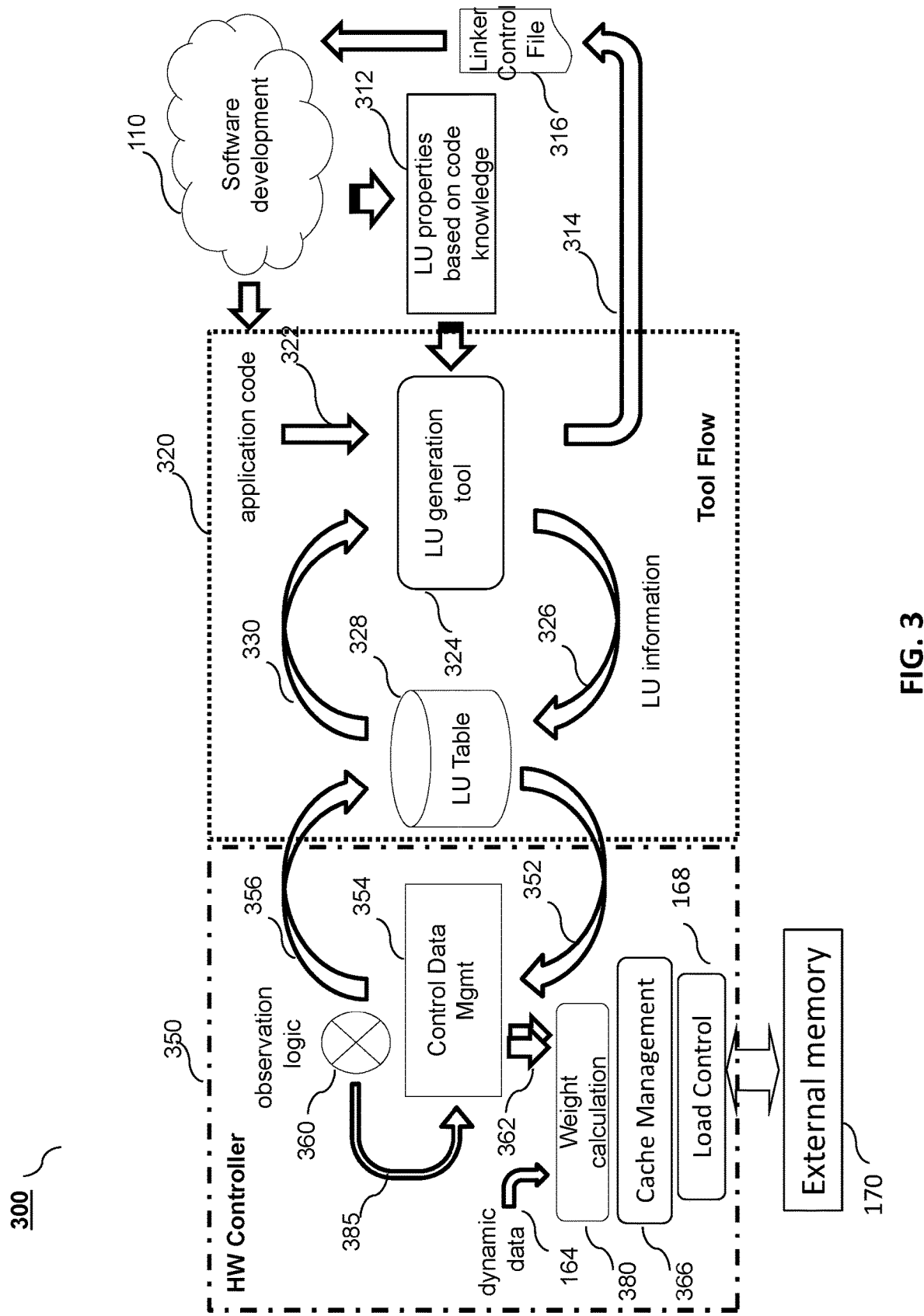
FIG. 3 illustrates an example approach for using a memory as cache for loading a set of instructions and constant data using variable sized load units from an external memory using a beneficial cache management supported by execution observation, in accordance with some example embodiments of the invention.

Referring now to FIG. 3, an example approach for using a memory as cache for loading a set of instructions and constant data using variable sized load units from an external memory that employs a beneficial cache management supported by execution observation for the cache management 300 is illustrated, in accordance with some example embodiments of the invention. Also, this example uses a tool based generation flow for the identification of those load units from the application software. Similar to FIG. 1, FIG. 3 identifies the high-level usage of LU metadata by a hardware (HW) controller circuit 350, which is a preferred embodiment of the controller that manages such an instruction cache. Other elements that are also required for the execution or by such an instruction cache, for example the main memory for storing the load units, or the processing elements running the application software, are not shown to avoid obfuscating the drawing and the description. Furthermore, elements or processing steps in this description that are equivalent to their counterpart in FIG. 1 are identified by their numbering in the earlier figure. It is also noteworthy that in this example embodiment the generation of the information for the LU table 328 may be timely and locally separated from using this information by the HW controller circuit 350. This relates to the fact that the tool flow that is generating the content of the LU table may be executed by a different computer system than information system 200 executing the application generated by the software development process 110; and the execution of the tool flow occurs usually as part of or after the software development, which is at a different time than the execution of the application by an information system 200.

In a similar manner to the earlier described FIG. 1, a classical software development environment 110 generates the corresponding application code, which is then analysed 322 by tool flow 320. The main operation of this process is performed by the LU generation software tool 324 within the tool flow 320, which generates metadata 326 about structuring the application code within a set of LU instances. This LU metadata is then stored within a database, e.g. the LU table 328. Since the application executes its software with the granularity of functions, the output of the tool flow 320 are beneficially LUs that combine one or multiple software functions, which are itself assumed as atomic elements by this LU generation step.

The initial content of the LU table 328 is generated in a similar manner to the content of the LU table 128 described in FIG. 1, holding at least equivalent information that may be further augmented with additional information. In accordance with some examples of the invention, the metadata generated by the LU generation tool 324 may be optionally further augmented with LU properties that a software developer or an user may provide 312 based on, say, knowledge about the software or its behaviour or that are generated from such information. In some examples, for the data content of one or multiple applications, it is envisaged that properties that may be defined by an user comprise at least one of the following: code specifics (such as safety relevant code, shared code, start-up code, critical functionality, maintenance code, etc.), and code usage aspects (usage frequency, urgency of usage, code value, replacement need), In addition, further information may be recorded within the LU metadata that is generated by observing the execution of the application code, or that is generated by the LU generation tool flow based on information that is collected by observing this execution. Corresponding examples for this data, and its usage by some example embodiments, are detailed in the following paragraphs.

The left side of FIG. 3 reflects the cache controller hardware, whilst the right side of FIG. 3 reflects the associated tool flow, where both are processing aspects of the application code that is provided by an application software development 110 process. The tool flow identifies the LU instance structure for this application code, whilst the cache controller hardware processes the loading and storage of these LU instances in the internal main memory. The only feedback to the software development process 314 is over the Linker Control file 316, in order to influence the LU association and code location in memory. Thus, the left side of FIG. 3 identifies the high-level usage of the LU metadata by some preferred example embodiments of the HW controller circuit 350 that manages such an instruction cache in the context of executing the application software. Here, the HW controller circuit 350 employs a Control Data Management circuit 354 that reads metadata 352 from the LU table 328 and provides this data to any part of the HW controller circuit 350 that needs this information. For example, one functional unit that requires this metadata 352 is the cache management circuit 366 that is configured to steer the instruction cache management. For this purpose, the cache management circuit 366 may utilize metadata 352 information directly as is, without any further processing.

In some examples, especially when information/metadata 352 may be beneficial to determine an arbitration or selection criteria, an additional processing operation is performed, using a weight calculation circuit 380. The cache management circuit 366, as well as the weight calculation circuit 380 may utilize further information, in a similar manner to the dynamically generated data 164 of FIG. 1 for their processing.

According to some examples of the invention, there is a beneficial interaction between loading of metadata 352, usage of the loaded metadata 352 by the weight calculation circuit 380 and a usage of the weight calculation result. In this context, within an example embodiment, the Control Data Management circuit 354 loads only information of interest into a specific metadata container element that is provided for this purpose. Thus, in some examples, there is a single container element made available for any specific cache management operation, which is then utilized for the calculation of a weight that is specific for the corresponding operation. In some examples, the weight calculation formula of every specific weight may be made controllable by software, which can specify, say, the usage (e.g. by a usage enable bit that selects whether (or not) a constituent is to be included), the sign and a relevance factor (e.g. by defining the selection of a multiplication factor to the constituent in the range of e.g. *256 . . . *1 and also *½ . . . *1/256) of every constituent for the weight calculation. A constituent in this context is one of the calculation factors of the weight calculation factor. In addition, in some examples, it is possible to combine some of these inputs with dynamic data 164, as described in FIG. 1. In some examples, some of the constituents of the calculation can be made LU specific, or cache state specific, or application specific (e.g. task related, start-up code, or software is in a critical situation).

In some examples, thereafter, the actual calculation of a weight value may then be a summation of intermediate results, where every intermediate result is generated from selected constituents after applying a sign and multiplying it with a relevance factor. This enables the calculation of a LU specific weight that can consider important aspects of an application, the instruction cache and its usage. In addition and in particular, it permits to reuse the same raw input with a completely different connotation for distinct aspects of the cache management, which is an important factor to reduce the amount of raw data required to steer the cache management operations. This approach is very beneficial to reduce the amount of storage for this data that is required: a) within the HW Controller 350, which can be an important cost factor of the hardware implementation and b) within the LU table 328, where the amount of required data impacts the amount of main memory that is required for this purpose. Such factors play an important part when taking into account the amount of LU instances to be managed by a preferred example embodiment. Furthermore, in some examples, the ability to steer the weight calculation with a formula that can be controlled by software, provides the flexibility to support the different needs that may be exhibited by different application setups that are to be supported by the same hardware implementation.

In some examples, one function overseen by the cache management circuit 366 is the loading of LUs. For this purpose, the HW controller 350 will usually include or employ (when there is one available outside of the HW controller 350) a load control unit 168, which performs this function. For this purpose, the load control unit 168 is connected to the external NVM memory 170.

In some examples, a further function of the cache management circuit 366 is the removal of a LU from the cache to make space for the next load operation, sometimes referred to as a cache eviction. In some examples, both LU processing operations require a weight calculation: (i) a load request weight to be able to arbitrate between multiple LU instances that may be (pre-)loaded; and (ii) determining the weight of a LU for the cache eviction, for example with a goal of selecting the least valuable LU as the next replacement eviction candidate. Clearly, both load request and load eviction instances are different (as only LU instances already in the cache can be evicted, and only LU instances not in the cache are in need to be loaded), as such the usage of different metadata 352 is inevitable. Thus, examples of the invention propose using distinct containers for the corresponding metadata (referred to herein respectively as LSH, SEC). This permits decoupling both operations and performing them independently and concurrently by different parts of the weight calculation circuit 380 and cache management circuit 366.

A further example of a function that requires this metadata 352 is the LU observation circuit 360, which identifies events or properties of interest for the usage of this instruction cache in the context of the application execution. For this purpose, the LU observation circuit 360 is beneficially coupled to the Control Data Management circuit 360 in order to have access to the corresponding metadata information. Since the instruction cache is configured to utilize LUs for its management, these events are usually related to load units. In some examples, the collected metadata information may include, for example, the number of usages of a LU, optionally further qualified with its previous cache status, the execution time of a LU, the time when a LU changes or a corresponding delay. Such metadata information is beneficially collected in relation to the LUs, since one intent of this observation activity is to identify potential optimizations related to these LUs.

Another beneficial usage of the collected metadata information may be a usage by the weight calculation circuit 380. Therefore the observation circuit 360 in one example embodiment is capable of writing this metadata information into the metadata container of a corresponding LU instance 385 that is managed by the control data management circuit 354. The control data management circuit 354 of one example embodiment is further capable of then writing 356 the collected information into the LU Table 328. In this context, the writing 356 of the collected information into the LU Table 328 may have multiple benefits, for example:

i) it provides a reporting channel that does not require an additional observation channel,
ii) it permits usage of this data by the executed application software, and
iii) it records the observed data persistently, such that it can be used later.

In some examples, the observation may be of the accesses during an execution of the application code. In some examples, a beneficial later usage of the recorded observation information, which thus becomes part of the LU metadata, may be the usage by the weight calculation. This enables an in-the-loop optimization of these calculations based on the observation results. Examples for the metadata within the LU table 328 that reflect performance data (e.g. raw common data) collected during the application run time may be one or more of the following: an amount of cache miss events associated with a specific cache state of the corresponding LU, associated delays (e.g. minimum and/or maximum and/or average) in association with a specific cache state of the corresponding LU, execution runtime related information (e.g. minimum and/or maximum and/or average execution time) of the corresponding LU, etc.

In some examples, a further beneficial usage of the recorded observation information may be usage by the LU generation tool 324, by reading it back 330 from the LU table 328. In this manner, the reading recorded observation information back 330 from the LU table 328 may occur during, say, a development phase within the software development environment, as well as in a real-world environment after some real usages of an application. Since this information is now part of the LU metadata, it can advantageously be collected for multiple software executions, and thus used to combine information of interest for different scenarios that only arise in distinct software executions. In some examples, it can be further utilized to advantageously identify differences in the collected information for those distinct scenarios. In some examples, another beneficial usage may be the usage to update or optimize other metadata information by the LU generation tool 324, based on information extracted from this data, which now can exhibit a far more holistic view of potential behaviours of the instruction cache. Last but not least, the LU generation tool 324 may further utilize information distilled from this data to provide optimization feedback 314 to the software development environment 110; e.g. by updating or enhancing the utilized Linker Control File 316 to include improvements based on findings from or gained from this observation information, thereby resulting in a modified location and/or LU containing an application function or a set of application functions.

In accordance with some examples of the invention, the metadata content of the LU table 328 for a single LU instance within this table may be further refined using data collected by the Cache Controller circuit 350 or gathered otherwise, e.g. by a profiling function.

In some examples, it is envisaged that any previous definition of LU metadata may be enhanced based on data collected by one application execution run (or multiple runs, say in an iterative process). In some examples, it is envisaged that collected information may consist of raw information; e.g. amount of LU miss(es), involved delays, execution times, sequencing information, etc. In some examples, it is envisaged that such collected information may involve complex calculations [e.g. execution ratio:=(sum of) code runtime/code size] that may also involve data from multiple runs; corresponding calculations may be performed by the LU generation tool flow based on collected raw data. In some examples, it is envisaged that such collected information may be further improved using specific properties, say based on development observations, application knowledge, or user input.

The above-described usage options of the collected observation information identify multiple, different usage scenarios, where each scenario enables its own optimization and refinement:

i) Immediate usage of collected information by the weight calculation during a run;
ii) Combination of collected information across multiple executions for optimizations by the tool flow, also for generating new metadata based on an evaluation of the corresponding findings;
iii) Utilizing the metadata updated based on such findings for a subsequent usage of the instruction cache;
iv) Utilizing the observation results or subsequent information gained from their evaluation to steer further improvements that are also possible within the software development environment; and
v) Utilizing the observation results or subsequent information gained from their evaluation to identify LU properties based on code knowledge.

Thus, it is envisaged that any of the above processing operations may utilize the collected data in a different way and from a different viewpoint. Advantageously, having a dense recording capability that only records the raw data minimizes related processing steps and minimizes the storage requirement for this information. The ability to account for the different usages and different viewpoints via a programmable weight calculation within the HW controller 350 enables the usage of the same data to be applicable and useful in all those scenarios, which is an important reduction in size and further reduces the accompanying hardware required to support this. It is also envisaged that, in some examples, any reduction of this metadata, and the amount of container elements has a direct impact on the associated hardware cost. Usage of common, raw metadata further minimizes the storage required by the LU table, which is also an important benefit.

Thus, examples of the invention are described in each of FIGS. 1-3, where FIG. 2 describes an example complete embedded system, whilst FIG. 1 and FIG. 3 primarily describe the cache controller circuit employed by such a system interacting with a tool flow to provide the relevant metadata information, where the tool flow and its interactions may be executed by a different system during the software development phase. Furthermore, FIG. 3 also illustrates receiving observation information for optimizations and its effects on the supporting environment. It is envisaged that in some alternative examples, the cache controller functionality and processing may occur in a different system than the described metadata preparation and postprocessing by the supporting environment (e.g. the tool flow), and/or in some instances at a different time (e.g. before responding after executing of the application). However this part of the processing is important to understand the beneficial usage of metadata across (multiple) runs and also as feedback for the LU generation and application software generation. For completeness, it is envisaged that each of FIGS. 1-3 show only portions of the possible functionality that are relevant for the purpose of describing the corresponding interactions, which is in case of FIG. 1 and FIG. 3 the interaction with the software development environment and the tool flow, and in case of FIG. 2 the interaction with the other elements of the system that implements a corresponding instruction cache. Thus, other standard elements and circuits that may be used in such a memory system are not shown, to avoid obfuscating the invention description.

Figure 4:
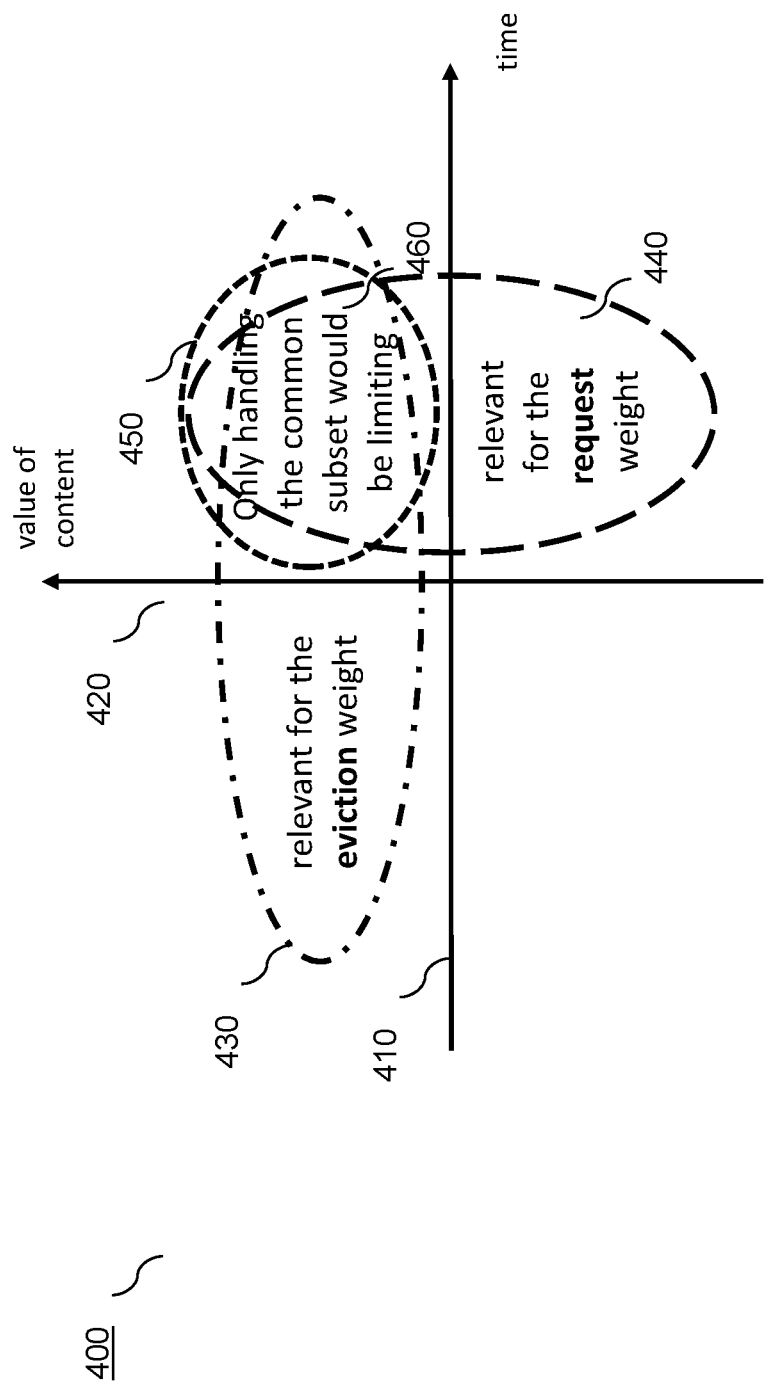
FIG. 4 illustrates benefits of using different criteria for the cache management in accordance with some example embodiments of the invention.

Referring now to FIG. 4, a graph 400 illustrating benefits of using different criteria for the cache management are shown, in accordance with some example embodiments of the invention. In accordance with some examples of the invention, different weight values may have different goals, which is especially true when there is a different arbitration or selection criteria. In accordance with some examples, the goal of the load request operation (e.g. determining the most urgently needed LU, thus minimizing the time for a load operation) and the goal of the cache eviction operation (e.g. determining the least valuable LU that can be replaced, thus optimizing the value of the content of the instruction cache) are ideal examples for such different criteria. However, it is envisaged that any of these criteria may need to be calculated on the same LU instance (when it is required to be loaded, or it has effectively been determined as a candidate for replacement) but not necessarily at the same time (it is unlikely that a LU is in need to be loaded into the cache and evicted from the cache at the same time). It is envisaged that in some examples some of these different criteria may utilize the same basic information, just in a different manner; e.g. a load request arbitration may prefer smaller LU instances (because they are more quickly loaded), whilst the cache eviction may prefer larger LU instances for the replacement (because they provide more free space). The common, basic raw data is the size of the LU instance, which can be preferably utilized by both weight calculations thus reducing the amount of data to be stored. Furthermore, some properties stored within the LU metadata may be relevant for a load request (e.g. a load urgency hint) but irrelevant for the cache eviction, and vice-versa (e.g. a data value hint). Thus, limiting the metadata for a LU to a subset of properties that is relevant for both functionalities would be limiting.

The weight calculation circuit 380 of FIG. 3 is configured to generate a weight value from its inputs, which is then utilized as arbitration or selection criteria. Using a weight as a normalized value for this purpose permits a common definition for a corresponding criterion across multiple applications. Utilizing common, raw data for the weight calculations can reduce the amount of required metadata, when it is possible to encode the different aspects of using this data in a different way. In some examples, this is accomplished by a weight specific, programmable calculation formula that permits to assign a different sign and an independent quantifier to every constituent of the calculation. In this context, the term 'constituent' refers to and encompasses any singular input of the calculation, which may be originated in either LU metadata or provided by internal information of the cache controller circuit, as described earlier. Examples for a weight calculation performed by weight calculation circuit 380 and using the common raw data that is controlled differently is (e.g. just using two of the much larger set of possible input values), include the following.

A first example for a Load Request weight calculation formula utilizes two common raw inputs, the <LU size> and the <state #1 delay>, which reflects the delay experienced in case of a critical (state #1) cache miss. The goal of this Load Request weight calculation formula is to prefer smaller LU instances that have experienced a larger delay in such earlier situations; where the later constituent is, say, 4 times more important than the size aspect. Potential factors include:
  (i) Sign of <LU size>: minus (smaller values are preferred);
  (ii) Factor of <LU size>:×2;
  (iii) Sign of <state #1 delay>: plus (larger delay is preferred); and
  (iv) Factor of <state #1 delay>:×16 (this factor is 4× more important).

Based on this example set of factors, an example (first) request weight calculation may be:

$$\text{Request\_weight} := \text{sign}(LU\_\text{size}) * \text{factor}(LU\_\text{size}) \\ * <LU\_\text{size}> + \text{sign}(\text{state \#1 delay}) * \text{factor}(\text{state \#1 delay}) * <\text{state \#1 delay}> \quad [1]$$

A second example for a Cache Eviction weight calculation formula again uses two common raw inputs, again the <LU size> and the factor <startup>, which only applies when the application software has indicated that the start-up phase has been finished, which is reflected by some dynamic data provided from a software programmable register. The goal of this Cache Eviction weight calculation formula is to prefer LU instances that are only used during the start-up phase (but only after this has been finished), otherwise larger LU instances are preferred by the eviction. Potential factors include:
  (i) Sign of <LU size>:plus (larger values are preferred);
  (ii) Factor of <LU size>:×4;
  (iii) Sign of <startup>;
  (iv) Value of <startup>: this is basically either 1 (when the internal state identifies the startup has been finished), otherwise it is a 0;
  (v) Factor of <startup>:×64 (this factor is 16× more important).

Based on this example set of factors, an example (second) eviction weight calculation may be:

$$\text{Eviction\_weight} := \text{sign}(LU\_\text{size}) * \text{factor}(LU\_\text{size}) \\ * <LU\_\text{size}> + \text{factor}(\text{startup}) * <\text{startup}> \quad [2]$$

In the above example, both weights include one common constituent, the <LU_size> and a second, specific constituent, which is a <startup> indication flag for the cache eviction weight respective a <state #1_delay> in case of the load request weight. Other examples of a preferred embodiment may utilize much more common raw inputs; e.g. the preferred embodiment calculates every weight from about, say, 30 constituents that can be controlled separately by a calculation formula.

Figure 5:
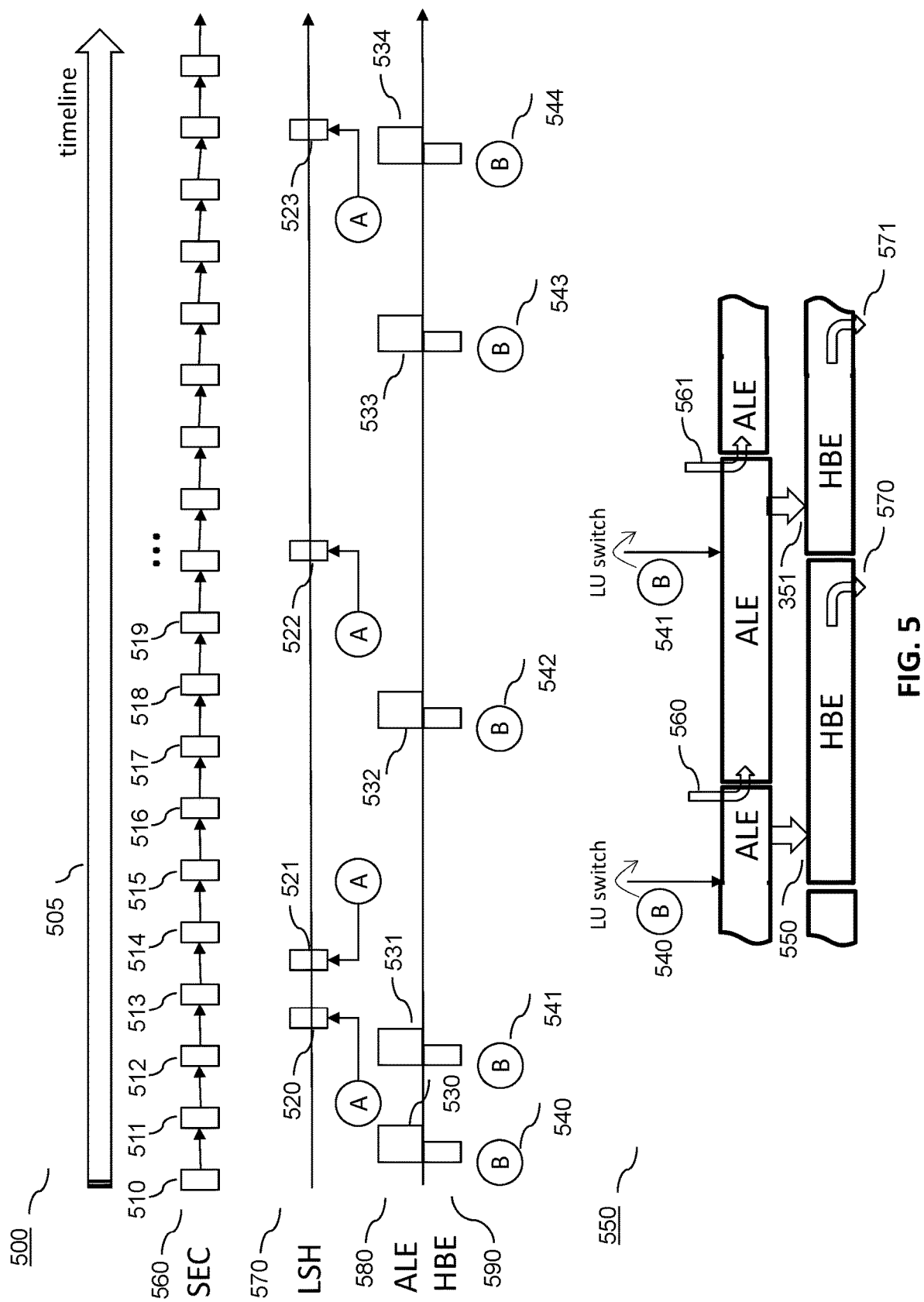
FIG. 5 illustrates an example timing diagram of elements employed in a system diagram of FIG. 1 or FIG. 2 or FIG. 3, together with the usage of some of these elements during load unit switching, in accordance with some example embodiments of the invention.

Referring now to FIG. 5, an example timing diagram 500 of elements employed in the system diagram of FIG. 1, FIG. 2 or FIG. 3, is illustrated, together with a usage of some of these elements during load unit switching, in accordance with some example embodiments of the invention. FIG. 5 also identifies the usage of the containers SEC 560, LSH 570, ALE 580 and HBE 590, along a timeline 505.

In this example, the cache replacement operation continuously selects a new candidate for replacement. The related metadata container SEC 560 is regularly loaded with the metadata for the selected LU, and in some examples used to calculate the weight for this replacement (@510, 511, 512, . . . 519). In this example, an anticipation mechanism selects irregularly a new LU to be anticipated (identified by an event (A) 520, 521, 522, 523. The related metadata container LSH 570 is loaded with the LU metadata whenever a new LU has been selected (which in this example is at any of the above events (A)). In some examples, the execution observation identifies whenever an address in another LU is hit by the execution (LU switch event (B) 540, 541, 542, 543, 544). The content of the containers ALE 580 and HBE 590 changes upon such an event in a specific order that is detailed in the expanded timing diagram 550 for one of these events. The expanded timing diagram 550 identifies related processing for two subsequent switches (e.g. the LU switch events (B) 540, 541) and the usage of the containers ALE 580 and HBE 590. Related modifications of the content of these two containers ALE 580 and HBE 590 occur in these LU switch events 530, 531, 532, 533, 534.

In more detail, the expanded timing diagram 550 identifies the related usage of the metadata containers ALE and HBE as follows. Upon detection of a LU switch event (B), which occurs at 540 whenever an address accessed by an observed bus master is within another LU, the current content of the ALE element 580 is immediately moved into the HBE element 590 at time 550. In some examples, this movement may occur nearly instantly; e.g. within a single cycle. Immediately after moving the current content of the ALE element 580 into the HBE element 590, the metadata for the next executed LU is loaded at 560 into the ALE element 580 (which is free after moving its earlier content to the HBE). This enables a beneficial and quick loading of the corresponding LU metadata for the next executed LU, which may be urgently required by the cache management operation. In some examples, performance data associated with the new LU, such as e.g. any delay involved with the LU switch, can now be stored immediately within the ALE container 580. Any performance data remaining to be collected that is related to the earlier LU and corresponding to the LU switch 540, such as the execution time of the earlier LU, can now be stored into the HBE container 590 without causing any interference with an operation related to the next executed LU. As soon as this data collection has been finished, the content of the HBE metadata container 590 can be written into System RAM at 570. The usage of a second metadata container HBE provides several benefits:
  i) it permits an immediate the loading of the LU metadata for the next LU (which is urgently needed),
  ii) it avoid having to wait for the ALE metadata contained to be freed by writing back collected performance data,
  iii) it permits an independent collection of performance data corresponding to the earlier LU and the next LU, and
  iv) it permits a delayed write back of collected performance data corresponding to the earlier LU.

In particular, this final (iv) benefit is useful because both aspects i) loading of LU metadata for the next LU and ii) writing back performance information collected for the earlier LU must access a common resource, the LU table, and cannot be performed concurrently when this resource is located in System RAM.

Since this operation of writing into System RAM at 570, must occur before the next LU switch at 541, the usage of a second container (i.e. the HBE container 590 in this example) permits a beneficial decoupling of all required operations listed above in case of the LU switch event. In this context, the usage of two metadata containers for LU switch observation by the above-described processing operation permits maximum concurrency with a minimum required hardware effort (e.g. using two containers instead of a single container). In this manner, the decoupling advantageously avoids any internal stalling/locking of any associated operation that would otherwise be required to avoid loss of information.

Figure 6:
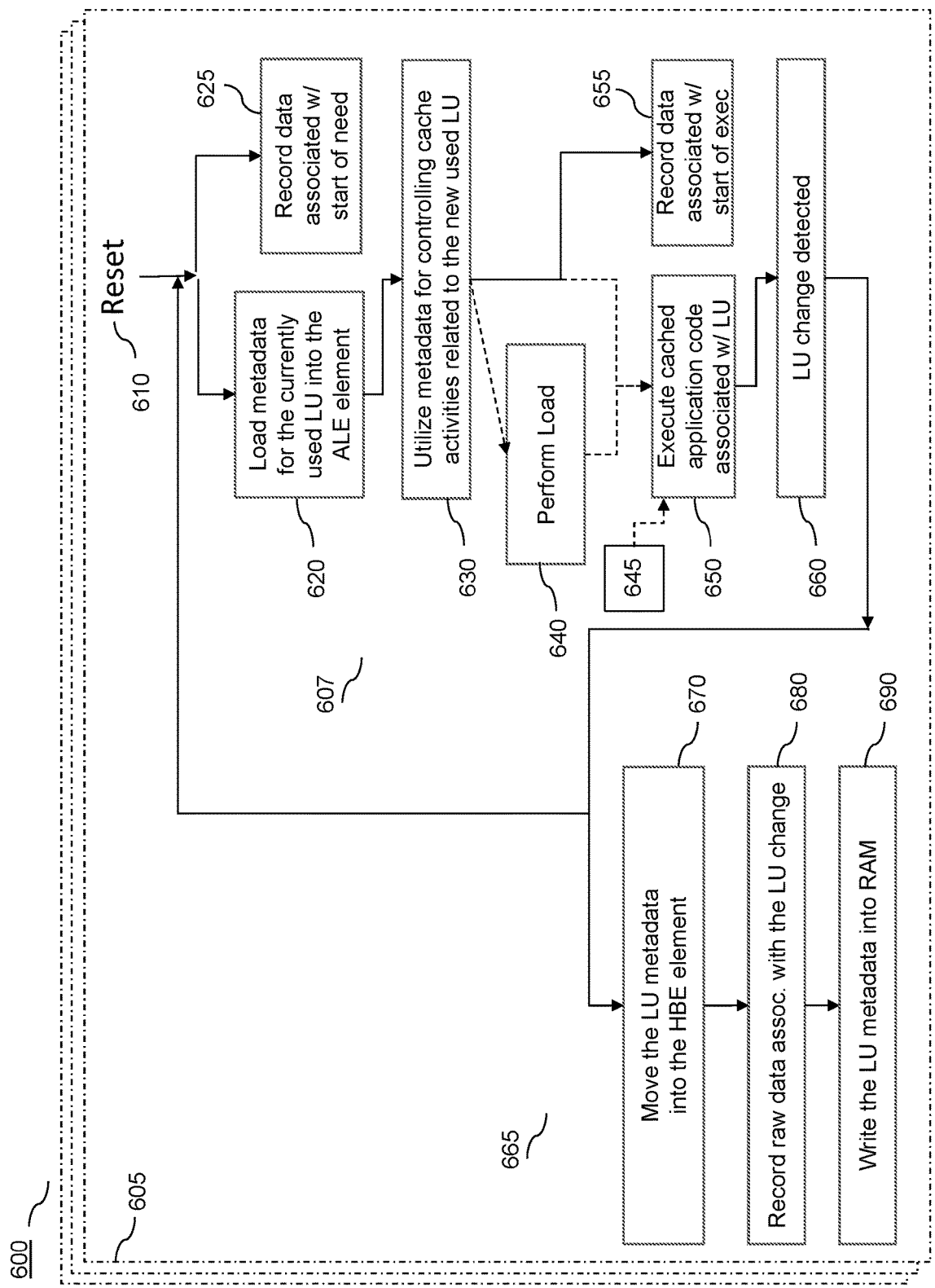
FIG. 6 illustrates an example flowchart of an execution observation operation by a hardware controller circuit, in accordance with some example embodiments of the invention.

Referring now to FIG. 6, an example flowchart 600 of an execution observation operation, i.e. an LU switch observation, by a hardware controller circuit (such as hardware controller circuit 350 of FIG. 3) is illustrated, in accordance with some example embodiments of the invention. As a follow up to FIG. 5, any weight calculation operation (e.g. any cache eviction weight calculation associated with an operation {510, . . . , 519, . . . } and also any load request weight calculation associated with an operation {520, . . . , 523, . . . } as shown in FIG. 5) can occur independently and concurrently (not shown in FIG. 6) to the execution observation, triggered by a corresponding need for such a weight calculation, e.g. due to identifying a load anticipation or eviction need. In this example, an LU switch observation related to a single bus master (e.g. the application software execution by a processor core 250 as depicted in FIG. 2) is performed (e.g. of hardware controller circuit 350 of FIG. 3 and by an observation element 262 of this hardware controller circuit 350 as depicted in FIG. 2).

In an example embodiment that employs multiple bus masters (e.g. such as the example embodiment depicted in FIG. 2), there are multiple such LU switch observations performed concurrently, which is depicted by the replicating rectangles 605 in FIG. 6. This potential multiplicity and concurrency of operations is one of the many reasons for an arbitration need that is supported by the usage of weights as arbitration criteria for the load request and cache eviction operations of the cache controller.

Following a reset operation at 610, a first processing sequence 607 is performed, where the LU metadata for the new (currently used) LU (which is the one LU instance that owns that address range next to be executed by the application software executed by a bus master) is loaded into the ALE element from the LU table located in internal memory at 620. Potentially concurrently with this operation, the corresponding raw data being part of the new LU metadata needed by the associated bus muster, is recorded at 625. In some examples, the recording at 625 may also be performed after loading the LU metadata.

The LU metadata is immediately needed to be able to perform related processing by the cache controller for controlling cache activities related to the new used LU at 630. An example for corresponding information is the start address and size of this LU that is required by, say, an address mapping function. Such an address mapping is a sometimes required function of such an instruction cache, in order to permit an execution of application software that is loaded from an external memory into an arbitrary location within an internal memory. In some examples of the invention, it is envisaged that corresponding processing operations are performed by the cache controller (e.g. the HW controller circuit 350) after utilizing the LU metadata at 630.

After performing the required processing (e.g. metadata utilizing) operations in 630, the loaded LU can be used by the application software when it is already available (cached) within the internal memory; otherwise the instructions and constant data related to the newly used LU must be loaded before they can be used by the application software. Another example for an operation that requires the LU metadata is an emergency load operation that is required when the newly used LU has not yet been loaded. Thus, in some examples, an optional 'perform LU loading' operation may be employed at 640. When the instructions and constant data related to the newly used LU have been loaded in the internal memory, the corresponding bus master can execute the application code contained in/associated with this LU at 650; this execution is then observed at 645 by the observation part of the cache control circuit. In a case of an already cached LU, this operation can be immediately entered without having to perform the LU loading operation at 640.

Concurrently with a (start of) execution of the application code, the raw data associated with a start of execution by the associated bus master, is recorded by the cache controller at 655. This recording is performed in any case, either when the LU must be loaded or also when the LU is already cached. In some examples, one purpose of this data may be to record information related to the cache management, e.g. corresponding delays within the performance data. In some examples, there may be different delays recorded when the corresponding LU needs to be loaded (e.g. at 640) or when the LU is already in cache, and thus only cache management information must be updated.

Having the capability to perform the recording of raw data by the cache controller at 625 and 655, concurrently to the related processing operations at 620 respective 650, is beneficial since it permits a correct observation 645 of associated delays. In addition, it is beneficial because it enables those related operations to be performed as quickly as possible, since otherwise the caching or application execution may be impacted by the need to record collected data. Thus, in some examples, the recording of the raw data associated with some cache management operations or effects of those cache management operations (e.g. loading of a LU), occurs substantially in parallel to these related operations, such as loading of new LUs at 640 or a start of an application execution at 650.

At this point, the execution of the application code contained within the newly used LU is performed by the associated bus master/processor core, which is observed at 645 by the cache controller circuit until a change to a new LU is detected at 660. In this case, the already-described processing 607 (illustrated as 620 through 660) repeats with metadata related to a next LU being loaded into the ALE element at 620.

After 660, when a LU change has been detected, a second, notably independent processing operation 665 is started. Advantageously, the second independent processing operation 665 is performed independently and concurrently with the earlier described processing 607. The only dependency of these further processing operations 665 to the earlier processing operations 607 is the starting point after detecting a first change to a new LU 660, and the need to finish this processing operation before another, second change to a new LU 660 is being detected (which may be the result of repeating the steps 620 through 660 of operations 607).

In some examples of the preferred embodiment, a detection of a LU change may trigger two activities: (i) a movement of LU metadata contained in the ALE element to the HBE element at 670; and (ii) a load of a new content into the ALE container at 620. While the latter is used to repeat the earlier described processing loop, the movement of metadata to a second container enables the independent and concurrent processing of this data, which is now described.

At 680, the performance data corresponding to the LU change (and related to the earlier executed LU) is recorded. At 690, the recorded LU metadata is written into RAM. In this manner, the write operation persistently records the information within the LU table. In some examples, the write operation may be performed later, but it must occur before another, new LU change is detected at 660.

As described before, the two execution sequences 607 (comprising of the steps 620 . . . 660), and 665 (consisting of the steps 670 . . . 690) execute concurrently and have as the only synchronization element the common detection of a LU change 660. Also this concurrent execution is made possible by provision of a second metadata container (HBE), instead of using a single one. Thus, the provision of a second metadata container (HBE) enables a beneficial decoupling and reordering of operations that would otherwise have to be performed in sequence and in a less beneficial order.

Some examples of the improvement provided by this decoupling can be appreciated by looking at the operations that would have been required without employing these concepts. For example, writing of collected raw data at 690 would have to be done before new data could be loaded into the ALE element at 620, in order to not overwrite this data. By employing the concepts herein described, the more urgent loading of LU metadata related to the newly used LU can be done before writing the collected observation information. Furthermore, for example, the LU metadata contained in the LU table cannot be read and written concurrently. In contrast, by employing the concepts herein described, a delayed writing permits to decouple both operations and enables a later writing of this information when there is no urgent loading of this data required. As a yet further example, moving the LU metadata from the ALE to the HBE container (reading data) can be performed concurrently with the new usage of the ALE container at 620 and 625 (which are writing this data). Unless one of these operations itself requires a longer processing time (which is likely for the loading of LU metadata in 620), any of these operations could be performed concurrently within a single cycle.

Thus, examples of the invention provide one or more of the following features that are not disclosed in known memory systems. First, the caching examples herein described, employ criteria where a load request (request weight) and a cache eviction (eviction weight) for a LU use different calculation formulas for both weights. In addition, the caching examples herein described, identify the usage of metadata to specify the multiplicity of load units utilized by an instruction cache. Secondly, the examples describe a beneficial support of an instruction cache that consists of a larger available internal memory, say, in a relation of 25%-75% of an application image when the application image is stored within an external memory. Furthermore, some of the examples describe an usage of an internal memory for purposes of instruction caching. Thirdly, some examples describe an usage of an internal memory operable with an additional instruction execution or memory access observation. In some examples, the caching examples herein described may be beneficially used where the memory system suffers from a severely limited bandwidth, for example in combination with a relative latency difference that is larger than the one experienced between internal memory types (which is usually within one magnitude of clock cycle) between an internal memory and external memory (which is larger than a single magnitude of clocks). In this manner, the caching examples herein described provide a mechanism to keep the most worthy data elements and thereby avoid frequent reloads (noting that known processor caches do not have such a bandwidth limitation). Furthermore, preloading must meet critical timing limitations in the caching examples herein described, which means there can be no trade-off with a LU that is being requested. Fourthly, the caching examples herein described do not utilize metadata about a load unit as basis for determining the weight criteria; as the metadata utilized by some examples for both (request weight and eviction weight) calculation formulas. Fifthly, it is noted that processor caches do not utilize metadata. Sixthly, the caching examples herein described benefit from having common raw data that is utilized differently, thereby providing a significant reduction of this data which is important. Seventhly, the caching examples herein described utilize a minimum amount of internal storage within the cache controller hardware for the purpose of loading metadata, e.g. the metadata container elements to support both the observation and weight calculation (two weights) per observed bus master. Eighthly, the caching examples herein described identify the usage of observation results of the cache management and related code execution aspects and in some examples record corresponding performance data. This caching example feature may provide multiple benefits. For example, the related code execution aspect can be used as debugging aid, permits optimizations during runtime and after a run/across multiple runs, and permits an identification of problematic LU elements that can then be treated specific. This caching example feature may also impact the software execution of the application that is supported by the cache memory; as related performance data: amount of execution cycles in a load unit and observed stall cycles due to a cache miss are also observed. Furthermore, the combination of these two observances are providing a critical information for controlling the cache. Ninthly, the caching examples herein described support the collection of observed performance data over multiple runs. Hence, the caching examples herein described may be performed during development, where there are often multiple verification/test runs covering different scenarios, all runs in combination are covering the complete set of intended use cases.

Tenthly, the caching examples herein described may use collected performance data and/or internal information to influence the weight calculation. The benefit of this feature is that it permits a higher dynamic in the control of the cache usage, which can react on changing system states (start-up, normal, critical situation), specific scenarios (lots of cache misses, severe amount of delays), or permit a LU specific behaviour (a LU that always, or very often causes problems is simply kept).

A skilled artisan will appreciate that the level of integration of the hardware controller, or Tool flow or control data management circuit or components may be, in some instances, implementation-dependent. Clearly, the various components within the hardware controller, or Tool flow or control data management circuit can be realized in discrete or integrated component form, with an ultimate structure therefore being an application-specific or design selection.

Because the illustrated embodiments of the present invention may, for the most part, be implemented using electronic components and circuits known to those skilled in the art, details have not been explained in any greater extent than that considered necessary, as illustrated below, for the understanding and appreciation of the underlying concepts of the present invention and in order not to obfuscate or distract from the teachings of the present invention.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. Also for example, the examples described herein, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired anti-spying counter measures by operating in accordance with suitable program code, such as minicomputers, personal computers, notepads, personal digital assistants, electronic games, automotive and other embedded information systems, commonly denoted in this application as 'computer systems'. However, it is envisaged that other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An embedded information system comprises:
a load control circuit coupleable to an external memory that contains instructions and constant data associated with at least one application code of a software application,
at least one processor coupled to at least one interconnect and configured to execute the at least one application code;
an internal memory coupled to the at least one interconnect and configured to store data for the software application as main system memory in a first part of the internal memory and as a cache for storing the instructions and constant data for an execution of the at least one application code from the external memory in a second part of the internal memory;
a cache control circuit coupled to the at least one interconnect and further coupled to, or comprising the load control circuit, wherein the instructions and constant data are organized by variable sized load units, LUs, and where at least one property of a LU is specified within metadata;
wherein the load control circuit is configured to load the LUs associated with the at least one application code from the external memory with a granularity of a single LU into the internal memory; and
wherein the cache control circuit manages the second part of the internal memory that is configured as a cache, based on metadata corresponding to the LUs, by being configured to:
observe the execution of at least a part of the at least one application code by detecting at least one of: an LU being executed, a change from one LU to another LU within the internal memory;
load metadata information corresponding to a LU instance from the external memory or the internal memory,
specify a next LU to be loaded by the load control circuit into the second part of the internal memory; and
specify a next LU to be evicted from the second part of the internal memory when there is insufficient space for loading the next LU.

2. The embedded information system of claim 1, wherein a first request for loading the next LU into the internal memory and a second request for evicting a LU from the internal memory are distinct operations of the cache control circuit that occur independently according to at least one of: at a different time, related to a different LU instance.

3. The embedded information system of claim 2, wherein the first request for loading a first LU instance corresponds to a first weight for selecting the first LU and the second request for evicting a second LU instance is corresponds to a second weight for selecting a second LU.

4. The embedded information system of claim 3, wherein the cache control circuit comprises a first dedicated hardware container, LSH, and a second dedicated hardware container, SEC, for storing metadata associated with a single LU instance, wherein:
the metadata in the LSH is utilized for the calculation of the first weight that manages the first request for loading a next LU from the external memory into the internal memory, and
the metadata in the SEC is utilized for a calculation of the second weight that manages the second request for evicting a LU from the internal memory.

5. The embedded information system claim 4, wherein a calculation of at least one of: the first weight and the second weight comprises: a summation of intermediate weight results, generated from selected constituents of the weights, where at least one of these constituents is derived from raw data provided by LU metadata after applying a sign and multiplying a selected constituent with a relevance factor.

6. The embedded information system of claim 4, wherein the cache control circuit comprises a third dedicated hardware container, HBE, for metadata associated with a previously executed LU; and a fourth dedicated hardware container, ALE, for metadata associated with the currently executed LU, wherein a determined change between LU instances moves the metadata of the currently executed LU from the ALE into the HBE.

7. The embedded information system of claim 3, wherein the first weight and the second weight are calculated independently using different weight calculation formulae that utilizes metadata information for at least one constituent of the first weight and the second weight.

8. The embedded information system of claim 4, wherein LU metadata within the first hardware container, LSH, and the second hardware container, SEC, comprises the same common raw data for different LU instances and the common raw data is used differently when calculating the first weight and the second weight for the same LU instance.

9. The embedded information system of claim 1, wherein the cache control circuit is configured to use a recorded observation of the execution of the at least part of the application code (288) to record at least one of: a previously used LU, a next LU, or a change from the previously used LU to the next LU.

10. The embedded information system of claim 9, wherein the metadata is augmented with the recorded observation of the execution of the at least part of the application code and additional internal information that is available within the cache control circuit, that comprises at least one further constituent derived from or augmented with at least one of: a status of an application reported to the cache control circuit, an internal state of the cache control circuit, a state of the LU associated with the first weight or second weight.

11. The embedded information system of claim 6, wherein the cache control circuit is configured to read metadata from a memory into the LSH, the SEC and the ALE dedicated hardware containers, and the cache control circuit is configured to write at least metadata associated with recorded observation information from the HBE dedicated hardware container to a memory.

12. The embedded information system of claim 1, wherein the at least one property of the metadata for a LU instance comprises a start address of the LU instance in the internal memory and at least one of: a size of the LU instance, an end address of the LU instance.

13. A method of memory management in an embedded information system that comprises at least one processor, at least one interconnect, an internal memory, and a cache control circuit coupled to, or comprising a load control circuit, wherein the method comprises:
connecting the load control circuit to an external memory that contains instructions and constant data associated with at least one application code;
organizing the instructions and constant data of the at least one application code by variable sized load units, LUs, where at least one property of a LU is specified within metadata;
configuring the internal memory to store data for the software application as main system memory in a first part of the internal memory and as a cache for storing the instructions and constant data loaded from the external memory for an execution of the at least one application code;
loading at least a part of the at least one application code from the external memory with a granularity of a single LU into the internal memory;
executing at least a part of the at least one application code associated with at least one LU instance located within the internal memory, and
managing a second part of the internal memory that is configured as a cache, based on metadata corresponding to the LUs, by:
observing the execution of at least a part of the at least one application code by detecting at least one of: an LU being executed, a change from one LU to another LU within the internal memory;
loading metadata information corresponding to a LU instance from the external memory or the internal memory;
specifying a next LU to be loaded into the second part of the internal memory; and
specifying a next LU to be evicted from the second part of the internal memory when there is insufficient space for loading the next LU.

14. The method of memory management in an embedded information system of claim 13, further comprising processing a first request for loading the next LU into the internal memory and processing a second request for evicting a LU from the internal memory wherein the processing of the first request and second request are distinct operations that occur independently according to at least one of: at a different time, related to a different LU instance.

15. The method of memory management in an embedded information system of claim 13, further comprising writing into metadata results of the execution observation.

* * * * *